United States Patent [19]

Greber et al.

[11] 3,950,308

[45] Apr. 13, 1976

[54] CROSSLINKED POLYMERS CONTAINING SILOXANE GROUPS

[75] Inventors: Gerd Greber, Binningen; Roland Darms, Therwil; Dieter Lohmann, Pratteln, all of Switzerland

[73] Assignee: Ciba-Geigy Corporation, Ardsley, N.Y.

[22] Filed: May 24, 1974

[21] Appl. No.: 473,022

[30] Foreign Application Priority Data
June 7, 1973 Switzerland.......................... 8260/73
Aug. 2, 1973 Switzerland........................ 11231/73

[52] U.S. Cl. ... 260/46.5 E; 260/46.5 G; 260/78 TF; 260/824 R
[51] Int. Cl.² ......................................... C08G 77/04
[58] Field of Search ....... 260/46.5 E, 78 TF, 47 CP, 260/824 R, 46.5 G

[56] References Cited
UNITED STATES PATENTS

| | | | |
|---|---|---|---|
| 3,288,754 | 11/1966 | Green | 260/46.5 E |
| 3,779,990 | 12/1973 | Greber et al. | 260/47 CP |

*Primary Examiner*—Lewis T. Jacobs
*Attorney, Agent, or Firm*—Luther A. R. Hall

[57] ABSTRACT

New crosslinked polyamides, polyimides and polyamide-imides, containing siloxane groups, are described, which are obtainable by heating silicon-modified polyamide, polyamide-acid and polyamide-amide-acid prepolymers in the presence of silanediols or siloxanediols to temperatures between 50° and 350°C. The crosslinked polymers, containing siloxane groups, according to the invention are distinguished by good mechanical, thermal and electrical properties.

14 Claims, No Drawings

CROSSLINKED POLYMERS CONTAINING SILOXANE GROUPS

The present invention relates to new crosslinked polyamides, polyimides and polyamide-imides containing siloxane groups, a process for their manufacture and their use as industrial products.

It has been found that new crosslinked polyamides, polyimides and polyamide-imides, containing siloxane groups and having a silicon content of 0.2 to 38.0% by weight, and having improved characteristics, can be manufactured by heating silicon-modified polyamide, polyamide-acid or polyamide-amide-acid prepolymers having an inherent viscosity of 0.04 to 4.0, of the formula I

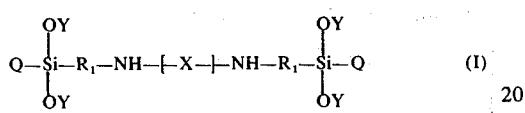

wherein X represents a structural element of the formula II

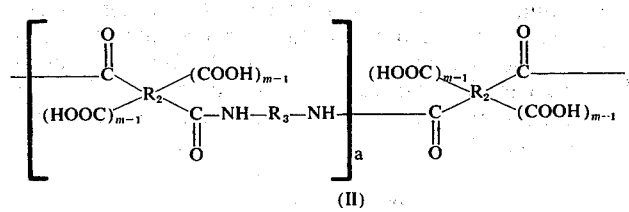

a denotes a number from 0 to 100, especially 0 to 60, and the individual $m$, $R_1$, $R_2$, $R_3$, $Q$ and $Y$ independently of one another denote the following: m denotes the number 1 or 2, $R_1$ denotes a radical $-(CH_2)_x-$,

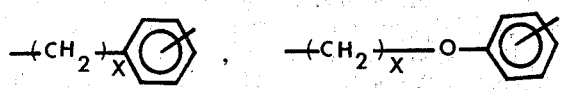

or

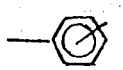

, with $x$ denoting a number from 1 to 4, $R_2$ denotes a carbocyclic-aromatic or heterocyclic radical, wherein the carbonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic radical, Q denotes methyl, phenyl or a —OY radical, with Y having the meaning indicated below, and Y denotes an alkyl radical with 1 to 6 carbon atoms or a phenyl radical, or corresponding cyclised derivatives, in the presence of a compound or a mixture of compounds of the formula VI

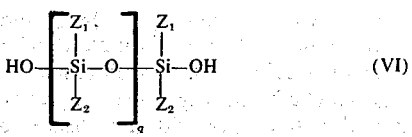

wherein $Z_1$ and $Z_2$ independently of one another denote methyl or phenyl and q denotes a number from 0 to 1,000, to temperatures between 50° and 350°C.

Preferably, the mixture is heated to temperatures between 150° and 225°C.

Silicon-modified polyamide, polyamide-acid or polyamide-amide-acid prepolymers which can be used according to the invention preferably have an inherent viscosity of 0.07 to 2.5.

The inherent viscosity $\eta_{inh.}$ is calculated from the following equation:

$$\eta_{inh.} = \frac{\ln \frac{\eta}{\eta_0}}{c}$$

In this equation the symbols have the following meaning: ln = natural logarithm, $\eta$ = viscosity of the solution (0.5% by weight of the polymer in a suitable solvent, for example N,N-dimethylacetamide, N,N-dimethylformamide or N-methylpyrrolidone), $\eta_o$ = viscosity of the solvent and $c$ = concentration of the polymer solution in g of polymer/100 ml of solvent.

The viscosity measurements are carried out at 25°C. As is generally known, the inherent viscosity represents a measure of the molecular weight of a polymer. The quoted values of $\eta_{inh.}$ = 0.04 to 4.0 correspond to average molecular weights of about 400 to 50,000. The average molecular weights can be determined by methods which are in themselves known, for example by means of light scattering.

The silanediols and siloxanediols of the formula VI are known.

The following may be mentioned as examples of suitable silanediols and siloxanediols: diethylsilanediol, diphenylsilanediol, methylphenylsilanediol, 1,1,3,3-tetramethyldisiloxane-1,3-diol, 1,1-dimethyl-3,3-diphenyl-disiloxane-1,3-diol, 1,1,3,3,5,5-hexamethyl-trisiloxane-1,5-diol, 1,1,3,3,5,5,7,7,9,9-decamethyl-pentasiloxane-1,9-diol, 1,1,3,3,5,5,7,7,9,9,11,11-dodecamethyl-hexasiloxane-1,11-diol and the corresponding higher homologues.

Preferably, a compound of the formula VI wherein $Z_1$ and $Z_2$ each denote methyl and q denotes a number from 1 to 200 is used, especially 1,1,3,3,5,5,7,7,9,9-decamethyl-pentasiloxane-1,9-diol or diphenylsilanediol ($Z_1$ and $Z_2$ = phenyl, $q = 0$).

The amount of the silanediol or siloxanediol to be employed can be varied within wide limits up to complete crosslinking of the prepolymer used and depends on the desired silicon content or degree of crosslinking of the end product.

Prepolymers according to the definition, with structural elements X of the formula II, wherein a ≥ 1 and the individual $m$, $R_2$ and/or $R_3$ can have different meanings, can be homopolymers or copolymers with a statistical distribution or with any desired at least partially block-like arrangement of polyamide, polyamide-acid and/or polyamide-amide-acid units, according to the definition in the structural element X, and can be, for example, homopolymers or block copolymers with terminal acid groups.

Thus, prepolymers of the formula I inter alia also comprise prepolymers wherin the structural element X can be represented by the formula IIa

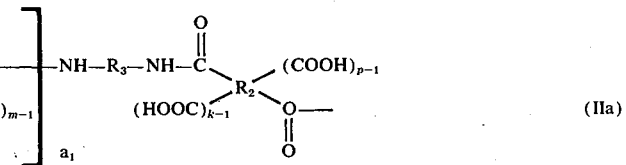
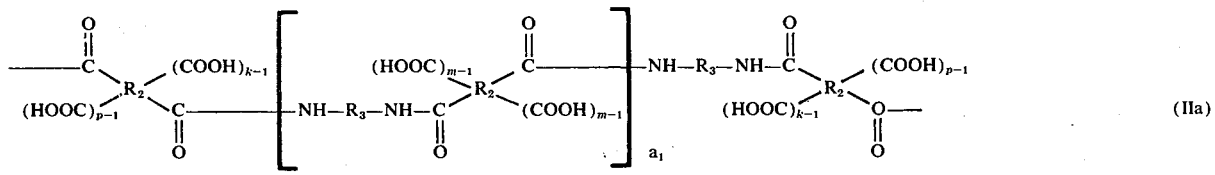

(IIa)

wherein $a_1$ denotes a number from 0 to 99 and k and p independently of one another denote the number 1 or 2 and what has been stated under the formula I applies to $R_1$, $R_2$, $R_3$, $m$, Q and Y, and the corresponding cyclised derivatives.

Silicon-modified prepolymers of the formula I which can be used according to the invention and wherein X represents a structural element of the formula II, and corresponding cyclised derivatives, can be manufactured by reacting, if $a = 0$, dicarboxylic acid dichlorides of the formula

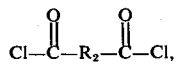

tricarboxylic acid anhydride chlorides of the formula

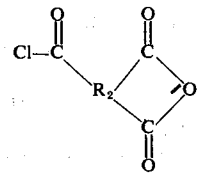

or tetracarboxylic acid dianhydrides of the formula

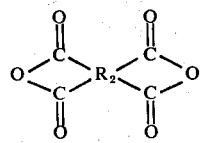

or, if a ≥ 1, polyamides or polyamide-amide-acids with 2 acid chloride end groups, polyamide-acids or polyamide-amide-acids with 2 anhydride end groups or polyamide-amide-acids with one acid chloride and one anhydride end group, all these apart from said end groups corresponding to the formula II, or corresponding cyclised derivatives, with at least 2 mols of an aminosilane of the formula III

wherein what has been stated under the formula I applies to $a$, $m$, $R_1$, $R_2$, $R_3$, Q and Y, and optionally subsequently chemically cyclising silicon-modified polyamide-acid or polyamide-amide-acid prepolymers.

Silicon-modified prepolymers of the formula I, which can be used according to the invention and wherein X represents a structural element of the formula IIa and $k = 2$ can also be obtained, according to a modified process, by reacting at least 2 mols of a compound of the formula IV

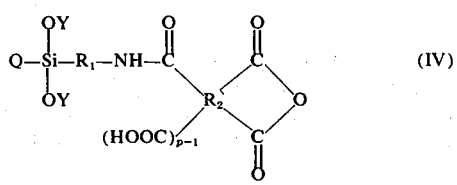

wherein $p$ is the number 1 or 2, the radical —COOH is in the ortho-position to the grouping —CO—NH—$R_1$— and the anhydride grouping is bonded to adjoining C atoms of the radical $R_2$, with a diamine of the formula $H_2N$—$R_3$—$NH_2$, if $a_1 = 0$, or a polyamide, a polyamide-acid or a polyamide-amide-acid, if $a_1$ ≥ 1, of the formula V

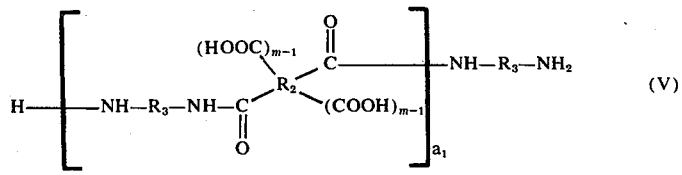

or corresponding cyclised derivatives, with the statements under formula I or IIa applying to $a_1$, $m$, $p$, $R_1$, $R_2$, $R_3$, Q and Y, and optionally subsequently chemically cyclising silicon-modified polyamide-acid or polyamide-amide-acid prepolymers.

If $R_2$ represents a carbocyclic-aromatic radical, the latter preferably has at least one 6-membered ring; in particular, these are monocyclic radicals, fused polycyclic radicals or polycyclic radicals with several cyclic, fused or non-fused systems, which can be linked to one another direct or via bridge members.

As examples of suitable bridge members there may be mentioned:

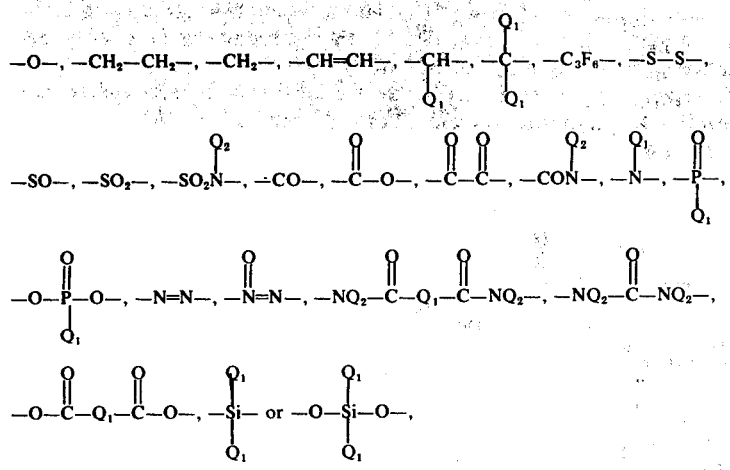

wherein $Q_1$ represents an alkyl or alkylene radical with 1 to 6, preferably 1 to 4, carbon atoms, which can optionally be substituted by halogen atoms, preferably fluorine, or a cycloalkyl, aryl or arylene radical and $Q_2$ represents hydrogen, an alkyl radical with 1 to 4 carbon atoms, which can optionally be substituted by halogen atoms, a cycloalkyl radical or an aryl radical. Such radicals can also be bonded to one another via two bridge members, such as two —$SO_2$— groups.

If $R_2$ denotes a heterocyclic radical, it can in particular be a 5-membered or 6-membered heterocyclic-aromatic, optionally benzo-condensed ring system containing O, N and/or S.

Carbocyclic-aromatic or heterocyclic radicals represented by $R_2$ can also be substituted, for example by nitro groups, alkyl groups with 1 to 4 carbon atoms, trifluoromethyl groups, halogen atoms, especially fluorine, silyl groups or sulphamoyl groups.

Radicals represented by $R_3$ can be unsubstituted or substituted, for example by halogen atoms, such as fluorine, chlorine or bromine, or by alkyl or alkoxy groups each with 1 to 4 carbon atoms.

If $R_3$ represents a carbocyclic-aromatic radical, it is preferably a monocyclic, fused polycyclic or non-fused bicyclic aromatic radial, and in the latter case the aromatic nuclei are bonded to one aother via a bridge member. Possible bridge members are the groups mentioned previously when discussing $R_2$. If $R_3$ denotes a heterocyclic radical, it is in particular a heterocyclic-aromatic 5-membered or 6-membered ring containing O, N and/or S.

Possible aliphatic radicals $R_3$ are above all alkylene radicals with 2 to 12 carbon atoms, and the alkylene chain can also be interrupted by hetero-atoms, such as O, S or N atoms.

If $R_3$ denotes a cycloaliphatic radical it represents, for example, the cyclohexyl or dicyclohexylmethane radical, whilst possible araliphatic radicals are above all, 1,3-, 1,4-or 2,4-bis-alkylenebenzene, 4,4′-bis-alky-lene-diphenyl and 4,4′-bis-alkylene-diphenyl-ether radicals.

Preferably, the individual $R_2$ independently of one another represent an unsubstituted monocyclic, fused polycyclic or non-fused bicyclic aromatic radical, the aromatic nuclei in the latter case being bonded to one another via the bridge member —O— or —CO—, whilst the individual $R_3$ preferably independently of one another denote a monocyclic or non-fused bicyclic aromatic radical which is optionally substituted by halogen atoms or alkyl or alkoxy groups with 1 to 4 carbon atoms each, an unsubstituted monocyclic arali-phatic radical or an unsubstituted alipatic radical possessing 2 to 10 carbon atoms.

Particularly preferentially, $R_2$ represents the 1,4- or 1,3-phenylene radical or a benzene ring or the benzophenone ring system and $R_3$ represents the 1,4- or 1,3-phenylene radical, the 4,4′-diphenylyl-ether radical or the 4,4′-diphenylmethane radical, but of $R_2$ and $R_3$ only one denotes a 1,4-phenylene radical.

The following may be mentioned as examples of alkyl radicals with 1 to 6 carbon atoms which Y represents: methyl, ethyl, n-propyl, iso-propyl, n-butyl, tert.-butyl, n-pentyl and n-hexyl radicals. Preferably, the individual Y represent an ethyl or propyl radical, especially the n-propyl radical, whilst Q, if Y = ethyl, preferably denotes the ethoxy group and, if Y = propyl, denotes the methyl group.

In general, if a or $a_1$ ≥ 1, prepolymers of the formula I with structural elements of the formula II or IIa, wherein the individual $R_2$ and $R_3$ have the same meaning, k, m and p are the same for each radical $R_2$, and what has been stated under the formula I applies to $R_1$, Q and Y, and the corresponding cyclised derivatives, are preferred.

According to a further preference, prepolymers of the formula I are used, wherein X represents a structural element of the formula IIb

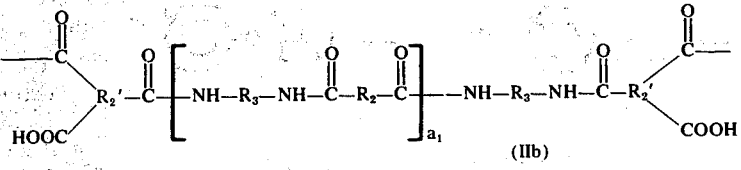

in which $a_1$ denotes a number from 1 to 99 and the two $R_2′$ each represent a benzene ring, with the carbonamide and carboxyl groups being bonded to different ring carbon atoms and the carboxyl groups each being in the ortho-position to the —CO—NH—R$_1$— grouping, and the individual R$_1$, R$_2$, R$_3$, Q and Y are identical, or corresponding derivatives with cyclised terminal carboxylic acid groups, and prepolymers of the formula I, wherein X represents a structural element of the formula IIc

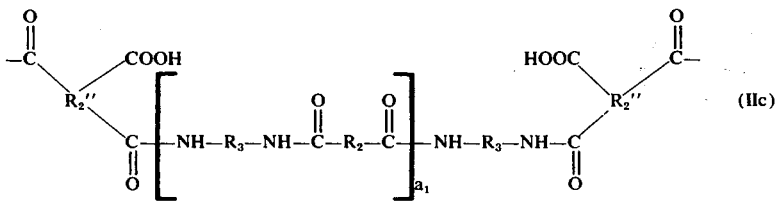

in which $a_1$ denotes a number from 1 to 99 and the two R$_2''$ each denote a benzene ring, with the carbonamide groups and carboxyl groups being bonded to different ring carbon atoms and the carboxyl groups being each in the ortho-position to the —CO—NH—R$_3$— grouping, and the individual R$_1$, R$_2$, R$_3$, Q and Y are identical, or corresponding derivatives with cyclised terminal carboxylic acid groups.

The following silicon-modified prepolymers are particularly preferred:

Prepolymers of the formula I, wherein X represents a structural element of the formula II with $m$ in each case = 1, or denotes a structural element of the formula IIb, R$_1$ in each case denotes a +CH$_2$+$_3$,

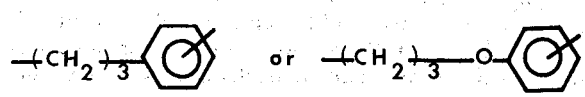

radical, the individual R$_2$ and R$_3$ are respectively identical and one of R$_2$ and R$_3$ represents the 1,4-phenylene radical and the other the 1,3-phenylene radical or R$_2$ and R$_3$ each represent the 1,3-phenylene radical, Q represents the methyl group and Y represents a propyl group, or Q represents the ethoxy group and Y the ethyl group, and what has been stated under the formula II or IIb applies to $a$, $a_1$ and R$_2$, or corresponding derivatives with cyclised terminal carboxylic acid groups;

prepolymers of the formula I, wherein X denotes a structural element of the formula II with $m$ = 2 in each case, R$_1$ in each case represents a +CH$_2$+$_3$,

radical, R$_2$ in each case denotes a benzene ring or the benzophenone ring system, R$_3$ in each case denotes the 4,4'-diphenylyl-ether or the 4,4'-diphenylylmethane radical, Q denotes the methyl group and Y denotes a propyl group or Q denotes the ethoxy group and Y the ethyl group and $a$ has the indicated meaning, or corresponding cyclised derivatives;

prepolymers of the formula I, wherein X represents a structural element of the formula IId

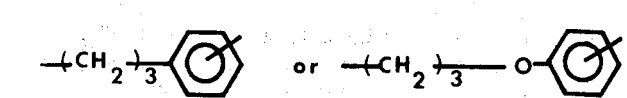

in which R$_1$ in each case represents a +CH$_2$+$_3$,

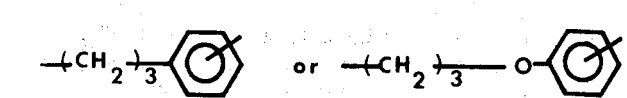

radical, R$_2$ in each case represents a benzene ring and R$_3$ in each case represents the 4,4'-diphenylylether or the 4,4'-diphenylylmethane radical, Q denotes the methyl group and Y denotes a propyl group or Q denotes the ethoxy group and Y denotes the ethyl group and $a$ has the indicated meaning, or corresponding cyclised derivatives, and prepolymers of the formula I, wherein X represents a structural element of the formula IIc, R$_1$ in each case represents a +CH$_2$+$_3$,

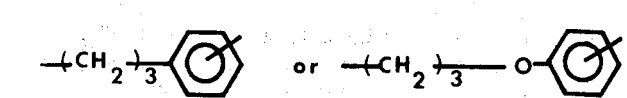

radical, the individual R$_2$ and R$_3$ are respectively identical and one of R$_2$ and R$_3$ denotes the 1,4-phenylene radical and the other the 1,3-phenylene radical or R$_2$ and R$_3$ each denote the 1,3-phenylene radical, Q denotes the methyl group and Y denotes a propyl group or Q denotes the ethoxy group and Y the ethyl group and $a_1$ and R$_2''$ have the indicated meaning, or corresponding derivatives with cyclised terminal carboxylic acid groups.

The starting products which can be used for the manufacture of the prepolymers are in themselves known or can be manufactured according to processes which are in themselves known.

Examples of dicarboxylic acid dichlorides of the formula

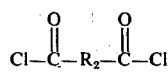

which can be used are thiophene-2,5-dicarboxylic acid dichloride and terephthalic acid dichloride, but above all isophthalic acid dichloride.

As a tricarboxylic acid anhydride-chloride of the formula

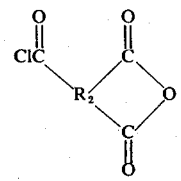

trimellitic acid 1,2-anhydride-chloride (1,3-dioxo-benzo[c]oxalane-5-carboxylic acid chloride) is used in particular.

Examples of tetracarboxylic acid dianhydrides of the formula

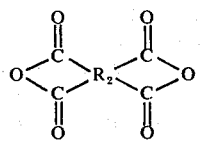

which can be used are pyromellitic acid dianhydride, 3,3′,4,4′-benzophenone-tetracarboxylic acid dianhydride, 2,3,3′,4′-benzophenone-tetracarboxylic acid dianhydride, 2,2′,3,3′-benzophenone-tetracarboxylic acid dianhydride, 3,3′,4,4′-diphenyltetracarboxylic acid dianhydride, 2,2′,3,3′-diphenyl-tetracarboxylic acid dianhydride, bis-(2,3-dicarboxyphenyl)-methane dianhydride, bis-(3,4-dicarboxyphenyl)-methane dianhydride, 2,2-bis-(2,3-dicarboxyphenyl)-propane dianhydride, bis-(3,4-dicarboxyphenyl)-ether dianhydride, bis-(3,4-dicarboxyphenyl)-sulphone dianhydride, N,N-(3,4-dicarboxyphenyl)-N-methylamine dianhydride, 3,3′,4,4′-tetracarboxybenzoyloxybenzene dianhydride, 2,3,6,7-naphthalene-tetracarboxylic acid dianhydride, 1.2,5,6-naphthalene-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride.

Instead of the abovementioned dianhydrides it is also possible to employ corresponding tetracarboxylic acid diesterdihalides, tetracarboxylic acid diester-diamides, tetracarboxylic acid diamide-dihalides, tetracarboxylic acid diesters or tetracarboxylic acid tetraesters.

Polyamides or polyamide-amide-acids with 2 acid chloride end groups, polyamide-acids or polyamide-amide-acids with 2 anhydride end groups, or polyamide-amide-acids with one acid chloride end group and one anhydride end group ($a \geq 1$), which apart from said end groups correspond to the formula II, can be manufactured by reacting an excess of suitable carboxylic acid derivatives, that is to say dicarboxylic acid dichlorides, tricarboxylic acid anhydride-chlorides or tetracarboxylic acid dianhydrides of the abovementioned formulae with one or more diamines of the formula $H_2N-R_3-NH_2$. If at the same time different carboxylic acid derivatives are employed, in a total excess over the diamine, copolymers corresponding to the formula II are obtained which have identical or different terminal acid groups and a statistical distribution of the polyamide, polyamide-acid and/or polyamide-amide-acid units. If, on the other hand, a single carboxylic acid derivative is used, in excess over the diamine, homopolymers with terminal acid groups are obtained, in which the terminal acid groups can, when using a tricarboxylic acid anhydride-chloride, also be different, depending on the type of linking.

Instead of tricarboxylic acid anhydride-chlorides it is also possible, in the case of $a \geq 2$, to employ tricarboxylic acid derivatives of the formula

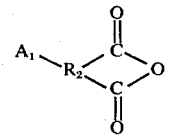

wherein $A_1$ denotes a —COO-alkyl radical with 1–5 carbon atoms in the alkyl group, a —COO-aryl or —COOH radical and the corresponding salts, such as alkali metal salts or ammonium salts or salts with tertiary bases. As examples there may be mentioned: +rimellitic acid anhydride, the Na salt of trimellitic acid anhydride, the ammonium salt of trimellitic acid anhydride, trimellitic acid anhydride monomethyl, monoethyl, monoisopropyl, mono-sec.-butyl or mono-tert.-butyl and monoisopentyl ester and trimellitic acid anhydride benzoic acid ester.

In these cases, a prepolymer possessing amino end groups is first prepared by reaction of a tricarboxylic acid derivative of this type with an excess of a diamine according to the definition, after which the prepolymer is allowed to react with at least 2 mols of a dicarboxylic acid dichloride, tricarboxylic acid anhydride-chloride or tetracarboxylic acid dianhydride.

Polymers corresponding to the formula IIb and having terminal acid groups can be manufactured analogously by allowing a homopolymer, copolymer or block copolymer possessing amino end groups, for example a polyamide homopolymer, to react with at least 2 mols of another carboxylic acid derivative, for example a tricarboxylic acid anhydride-chloride, such as trimellitic acid 1,2-anhydride-chloride.

Block copolymers with terminal acid groups can be obtained by reacting an excess of one or more copolymers or homopolymers with terminal acid groups, prepared in the manner described above, with homopolymers or copolymers possessing amino end groups.

Finally, starting products corresponding to the formula II, having terminal acid groups and a partially block-like arrangement of polyamide, polyamide-acid and/or polyamide-amide-acid units, can be prepared, for example, by reacting an excess of a homopolymer possessing terminal acid groups with a diamine according to the definition.

Polymers of the formula V possessing amino end groups can be manufactured analogously by employing the diamine or diamines or the polymers with terminal amino groups in excess over the carboxylic acid derivatives or the polymers possessing terminal acid groups.

Polyamide-acid or polyamide-amide-acid polymers thus obtained can, if desired, be cyclised thermally or chemically, by methods which are in themselves known, before the reaction with the aminosilanes of the formula III or the compounds of the formula IV.

Preferred dicarboxylic acid derivatives, tricarboxylic acid derivatives or tetracarboxylic acid derivatives for the above reactions are isophthalic acid dichloride, trimellitic acid anhydride, trimellitic acid 1,2-anhydride-chloride, pyromellitic acid dianhydride and benzophenonetetracarboxylic acid dianhydride.

Compounds which are in themselves known can be used as the diamines of the formula $H_2N-R_3-NH_2$.

The following may be mentioned as specific examples of carbocyclic-aromatic diamines: o-, m- and p-phenylenediamine, diaminotoluenes, such as 2,4-diaminotoluene, 1,4-diamino-2-methoxybenzene, 2,5-diaminoxylene, 1,3-diamino-4-chlorobenzene, 1,4-diamino-2,5-dichlorobenzene, 1,4-diamino-2-bromobenzene, 1,3-diamino-4-isopropylbenzene, N,N'-diphenyl-1,4-phenylenediamine, 4,4'-diaminodiphenyl-2,2-propane, 4,4'-diaminodiphenylmethane, 2,2'- or 4,4'-diaminostilbene, 4,4'-diaminodiphenyl-ether, 4,4'-diaminodiphenyl-thioether, 4,4'-diaminodiphenyl-sulphone, 3,3'-diaminodiphenylsulphone, 4,4'-diaminobenzoic acid phenyl ester, 2,2'- or 4,4'-diaminobenzophenone, 4,4'-diaminobenzil, 4-(4'-aminophenylcarbamoyl)-aniline, bis-(4-aminophenyl)-phosphine oxide, bis-(4-aminophenyl)-methyl-phosphine oxide, bis-(3-aminophenyl)-methylphosphine oxide, bis-(4-aminophenyl)-phenylphosphine oxide, bis-(4-aminophenyl)-cyclohexylphosphine oxide, N,N-bis-(4-aminophenyl)-N-phenylamine, N,N-bis-(4-aminophenyl)-N-methylamine, 4,4'-diaminophenylurea, 1,8- or 1,5-diaminonaphthalene, 1,5-diaminoanthraquinone, diaminofluoranthene, bis-(4-aminophenyl)-diethylsilane, bis-(4-aminophenyl)-dimethylsilane and bis-(4-aminophenyl)-tetramethyldisiloxane.

Particularly preferred compounds are 1,4- and above all 1,3-phenylenediamine, 4,4'-diaminodiphenyl ether and 4,4'-diaminodiphenyl-methane.

Examples of heterocyclic diamines are: 2,6-diaminopyridine, 2,4-diaminopyrimidine, 2,4-diamino-s-triazine, 2,7-diamino-dibenzofurane, 2,7-diaminocarbazole, 3,7-diaminophenothiazine and 2,5-diamino-1,3,4-thiadiazole.

As aliphatic diamines there may be mentioned: dimethylenediamine, trimethylenediamine, tetramethylenediamine, hexamethylenediamine, heptamethylenediamine, octamethylenediamine, nonamethylenediamine and decamethylenediamine, 2,2-dimethylpropylenediamine, 2,5-dimethylhexamethylenediamine, 2,5-dimethylheptamethylenediamine, 4,4-dimethylheptamethylenediamine, 3-methylheptamethylenediamine, 3-methoxyhexamethylenediamine, 5-methylnonamethylenediamine, 2,11-diaminododecane, 1,12-diaminoctadecane, 1,2-bis-(3-aminopropoxy)-ethane, N,N'-dimethylethylenediamine, N,N'-diethyl-1,3-diaminopropane and N,N'-dimethyl-1,6-diaminohexane as well as the diamines of the formulae
$H_2N(CH_2)_3O(CH_2)_2O(CH_2)_3NH_2$ and
$H_2N(CH_2)_3S(CH_2)_3NH_2$.

Finally, 1,4-diaminocyclohexane and 4,4'-diaminodicyclohexylmethane may be mentioned as suitable cycloaliphatic diamines and 1,4-bis-(2-methyl-4-aminopentyl)-benzene, 1,4-bis-(1,1-dimethyl-5-aminopentyl)-benzene and 1,3- or 1,4-bis-(aminomethyl)-benzene may be mentioned as suitable araliphatic diamines.

The condensation reactions described are carried out in a manner which is in itself known, preferably in an anhydrous organic solvent, for example N,N-dialkylamides of monocarboxylic acids with 1–4 carbon atoms, such as N,N-dimethylacetamide and N,N-dimethylformamide; N-methyl-2-pyrrolidone, N,N,N',N'-tetramethylurea, tetrahydrofurane, cyclohexanone, hexamethylphosphoric acid triamide (Hexametapol), tetrahydrothiophene dioxide (sulpholane) or dimethylsulphoxide. Depending on the nature of the reactants, the reaction temperatures are between about −20°C and +250°C.

The aminosilanes of the formula III, according to the definition, are also known in themselves or can be manufactured according to known methods.

The following may be mentioned as examples of suitable aminosilanes of the formula III: aminomethyl-di-n-propoxy-methylsilane, (β-aminoethyl)-di-n-propoxy-methylsilane, (β-aminoethyl)-diethoxy-phenylsilane, (β-aminoethyl)-tri-n-propoxysilane, (β-aminoethyl)-dimethoxy-methylsilane, (γ-aminopropyl)-di-n-propoxy-methylsilane, (γ-aminopropyl)-di-n-butoxy-methylsilane, (γ-aminopropyl)-trimethoxysilane, (γ-aminopropyl)-triethoxysilane, (γ-aminopropyl)-di-n-pentoxy-phenylsilane, (γ-aminopropyl)-methoxy-n-propoxy-methylsilane, (δ-aminobutyl)-dimethoxy-methylsilane, (3-aminophenyl)-di-n-propoxy-methyl-silane, (4-aminophenyl)-tri-n-propoxysilane, [β-(4-aminophenyl)-ethyl]-diethoxy-methylsilane, [-(3-aminophenyl)-ethyl]-di-n-propoxy-phenylsilane, [γ-(4-aminophenyl)-propyl]-di-n-propoxy-methylsilane, [γ-(4-aminophenoxy)-propyl]-di-n-propoxy-methylsilane and [γ-(3-aminophenoxy)-propyl]-di-n-butoxy-methylsilane. (γ-Aminopropyl)-triethoxysilane and [γ-(4-aminophenyl)-propyl]-di-n-propoxy-methylsilane, but very particularly (γ-aminopropyl)-di-n-propoxy-methylsilane and [γ-(4-aminophenoxy)-propyl]-di-n-propoxy-methylsilane, are preferred.

The compounds of the formula IV are new; they can be manufactured in what is in itself a conventional manner by reaction of aminosilanes of the formula III with a tricarboxylic acid anhydride-chloride or tetracarboxylic acid dianhydride of the formula

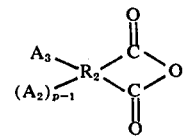

wherein $R_2$ has the meaning indicated under the formula I, $p$ is the number 1 or 2, $A_3$ together with $A_2$, if $p = 2$, forms an anhydride group

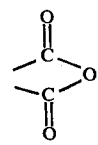

or $A_3$, if $p = 1$, represents the —COCl radical, with $A_2$ and $A_3$ being in the ortho-position to one another and the anhydride group being bonded to adjacent carbon atoms of the radical $R_2$, such as pyromellitic acid dianhydride and benzophenonetetracarboxylic acid dianhydride, but above all trimellitic acid 1,2-anhydride-chloride. The reaction is preferably carried out in an anhydrous organic solvent, such as chlorinated aliphatic hydrocarbons, for example dichloroethane, methylene chloride or perchloroethylene, and in the presence of an acid-binding agent, such as triethylamine, at temperatures of about −40°C to +30°C. After completion of the reaction, and after filtering off the hydrochloride which has precipitated, the compounds of the formula IV can be purified by recrystallisation from a suitable solvent, such as benzene.

Examples of suitable compounds of the formula IV are: trimellitic acid 1,2-anhydride-$\beta$-(trimethoxysilyl)-ethylamide, trimellitic acid 1,2-anhydride-$\gamma$-(di-n-propoxy-methylsilyl)-propylamide, trimellitic acid 1,2-anhydride-$\gamma$-(tri-n-propoxysilyl)-propylamide, trimellitic acid 1,2-anhydride-4'-[$\gamma$-(di-n-propoxy-methylsilyl)-propoxy]-anilide, trimellitic acid 1,2-anhydride-4'-[$\gamma$-(di-n-propoxy-methylsilyl)-propyl]-anilide, trimellitic acid 1,2-anhydride-3'-(diethoxy-methylsilyl)-anilide, pyromellitic acid 1,2-anhydride-4-[$\beta$-(trimethoxysilyl)-ethylamide], pyromellitic acid 1,2-anhydride-4-[$\gamma$-(di-n-propoxy-methylsilyl)-propylamide] and benzophenonetetracarboxylic acid 3,4-anhydride-4'-[$\gamma$-(triethoxysilyl)-propylamide].

The reaction of the abovementioned starting products, with at least 2 mols of an aminosilane of the formula III or of a compound of the formula IV, can be carried out in a manner which is in itself known, preferably in an anhydrous organic solvent at temperatures between about −20°C and +50°C, especially about −15°C to +25°C. Suitable organic solvents are: N,N-dimethylacetamide, N,N-diethylacetamide, N,N-dimethylformamide, N,N-dimethylmethoxyacetamide, N-methyl-2-pyrrolidone, N-acetyl-2-pyrrolidone, N-methyl-$\epsilon$-caprolactam, hexamethylphosphoric acid triamide (Hexametapol), N,N,N',N'-tetramethylurea, tetrahydrofurane, cyclohexanone, tetrahydrothiophene dioxide (sulpholane) and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic optionally chlorinated hydrocarbons, for example benzene, toluene, xylenes, cyclohexane, pentane, hexane, petroleum ether and methylene chloride or dioxane.

If the aminosilanes of the formula III and/or the compounds of the formula IV are reacted with polymers according to the definition, the latter are suitably employed in the form of their solutions as obtained when the polymers are manufactured.

In the reaction with aminosilanes of the formula III or compounds of the formula IV, preferably at least 2 mols of the same aminosilane of the formula III or the same compound of the formula IV are used. However, to manufacture asymmetrical prepolymers of the formula I it is also possible to employ mixtures of the said compounds in corresponding molar amounts or to carry out the reaction stepwise with in each case at least one mol of a different aminosilane of the formula III or of a different compound of the formula IV.

In all these cases, the aminosilane or the compound of the formula IV is preferably employed in the stoichiometric amount.

An optional cyclisation of the prepolymers of the polyamide-acid or polyamide-amide-acid category, which can be used according to the invention, to give the corresponding polyimides or polyamide-imides by a chemical method prior to the thermal crosslinking is also carried out in a manner which is in itself known, for example by gentle treatment with a dehydrating agent, used by itself or mixed with a tertiary amine; examples of agents which can be used are acetic anhydride, propionic anhydride and dicyclohexylcarbodiimide or a mixture of acetic anhydride and triethylamine or pyridine. To avoid crosslinking reactions, this process should be carried out at temperatures which are as low as possible, preferably at a temperature below 50°C and in particular between about −20°C and +25°C. In general, however, such a chemical cyclisation preceding the crosslinking is dispensed with.

The crosslinked polymers containing siloxane groups, according to the invention, are insoluble in organic solvents; they are distinguished by good mechanical, thermal and electrical properties, especially good corona resistance properties. The crosslinking of the prepolymers with the silanediols or siloxanediols is usually carried out during processing of the corresponding reaction mixtures, preferably in the form of solutions, to give industrial products, such as fibres, films (foils), coatings, laminating resins, laminates, compression moulding powders, compression mouldings and the like.

Customary additives, such as pigments, fillers and the like, can also be added to the reaction mixtures. With rising silicon content, products of increased elasticity and flexibility even at low temperatures are obtained.

The present invention therefore also relates to the use of crosslinked polyamides or polyimides containing siloxane groups, according to the invention, as industrial products.

EXAMPLE 1

13.553 g (0.0666 mol) of isophthalic acid dichloride are dissolved in 100 ml of anhydrous N,N-dimethylacetamide (DMA) at −15°C under nitrogen in a 750 ml sulphonation flask which is equipped with a stirrer, internal thermometer, dropping funnel and gas inlet tube. 3.6047 g (0.0333 mol) of m-phenylenediamine in solid form are introduced into this solution at −10° to −15°C, whilst cooling. After the exothermic reaction has subsided, the mixture is stirred for a further 2 hours at 0–5°C and a solution of 6.746 g (0.0666 mol) of triethylamine in 50 ml of anhydrous DMA is then added dropwise at the same temperature. After stirring for one hour at 0°–5°C, a solution of 14.6266 g (0.0666 mol) of ($\gamma$-aminopropyl)-di-n-propoxy-methylsilane and 6.746 g (0.0666 mol) of triethylamine in 50 ml of anhydrous DMA is added dropwise to the suspension obtained. The reaction mixture is then stirred for 2 hours at room temperature (20°–25°C) and in triethylamine hydrochloride which has precipitated is filtered off through a glass frit and rinsed 3 times with a total of 80 ml of anhydrous DMA. A slightly viscous solution of a polyamide prepolymer with terminal methyl-di-n-propoxysilyl groups and an average molecular weight ($\bar{M}$) of approx. 800 is obtained; $\eta_{inh.}$ 0.07 dl/g (0.5% in DMA at 25°C).

The solution of the above prepolymer is made up to a total of 355 g with anhydrous DMA; 0.544 g (0.0014 mol) of 1,1,3,3,5,5,7,7,9,9-decamethylpentasiloxane-1,9-diol is then added to 21.36 g (0.002 mol) of the resulting dilute solution and the mixture is cast onto an aluminium foil and heated as follows: for 3 hours to 70°C/30 mm Hg, for 3 hours to 110°C/30 mm Hg, for 10 hours to 150°C/30 mm Hg and finally for 4 hours to 200°C/0.1 mm Hg.

A clear, mechanically strong coating for the corresponding crosslinked polyamide containing siloxane groups, having a silicon content of 19.8% by weight, is obtained.

On dissolving off the aluminium foil with dilute hydrochloric acid, a clear, colourless film of good mechanical strength is obtained.

EXAMPLES 2 – 4

If in Example 1, whilst otherwise following the same procedure, the amount of 1,1,3,3,5,5,7,7,9,9-decamethylpentasiloxane-1,9-diol indicated below is used instead of 0.544 g, coatings or films of crosslinked polyamides containing siloxane groups, having similar properties, are obtained.

Table 1

| Example No. | Siloxanediol | Si content of the crosslinked polymer |
|---|---|---|
| 2 | 0.78 g (0.002 mol) of decamethyl-pentasiloxane-1,9-diol | 21.5% by weight |
| 3 | 0.97 g (0.0025 mol) of deca-methyl-pentasiloxane-1,9-diol | 23% by weight |
| 4 | 1.17 g (0.003 mol) of decamethyl-pentasiloxane-1,9-diol | 24.7% by weight |

EXAMPLE 5

Following the procedure described in Example 1, 4.866 g (0.045 mol) of m-phenylenediamine in anhydrous DMA, with the addition of 8.096 g (0.08 mol) of triethylamine, are reacted with 8.121 g (0.04 mol) of isophthalic acid dichloride. A solution of a polyamide block with terminal amino groups and an average molecular weight of approx. 2,000 is obtained. This solution is added dropwise over the course of 15 minutes, at 20°–25°C, to a solution of 4.856 g (0.01 mol) of trimellitic acid 1,2-anhydride-4'-[γ-di-n-propoxy-methylsilyl)-propoxy]-anilide of the formula

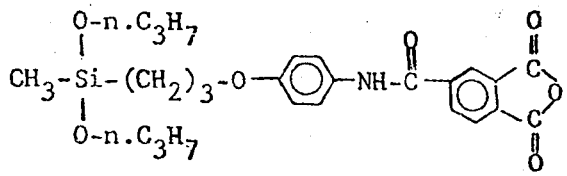

A solution of a polyamide prepolymer with terminal methyl di-n-propoxysilyl groups and an average molecular weight of approx. 3,000 results; $\eta_{inh.}$ 0.19 dl/g (0.5% in DMA at 25°C).

This solution, after suitable dilution and addition of a siloxanediol or silanediol, such as decamethyl-pentasiloxane-1,9-diol or diphenylsilanediol in the molar ratios of 0.5 to 2.0, can be converted in the manner described in Example 1 to give coatings or films of the corresponding crosslinked polyamide.

The trimellitic acid 1,2-anhydride-4'-[γ-(di-n-propoxy-methylsilyl)-propoxy]-anilide used in the above example can be prepared as follows:

50 ml of dichloroethane are initially introduced into a 1.5 l sulphonation flask which is equipped with a stirrer, internal thermometer, reflux condenser, 2 dropping funnels with pressure equilibration, and a nitrogen inlet, and are cooled to −30° to −40°C. 21.0 g (0.1 mol) of trimellitic acid 1,2-anhydride-chloride in 250 ml of dichloroethane and 31.1 g (0.1 mol) of [γ-(4-aminophenoxy)-propyl]-di-n-propoxy-methylsilane and 10.1 g of triethylamine in 250 ml of dichloroethane are then simultaneously added dropwise at −30°C over the course of 1 hour and 20 minutes. The reaction mixture is stirred for approx. 4 hours at −30°C, after which it is allowed to warm to room temperature. The triethylamine hydrochloride which has precipitated is filtered off under nitrogen and the filtrate is evaporated to dryness in vacuo, with exclusion of moisture. The resulting yellow crystalline powder is recrystallised 3–4 times from benzene, with exclusion of moisture, to remove residual triethylamine hydrochloride. Yield 38 g (76% of theory).

EXAMPLES 6 – 8

Analogously to the procedure described in Example 1, 10.814 g (0.1 mol) of m-phenylenediamine are dissolved in 100 ml of anhydrous DMA. 16.264 g (0.08 mol) of isophthalic acid dichloride in solid form are introduced into the resulting solution at −20°C, whilst cooling. The reaction mixture is then stirred for 2 hours at 0°–5°C and a solution of 16.192 g (0.16 mol) of triethylamine in 50 ml of dry DMA is then added dropwise. After stirring for one hour at 5°–10°C, the solution is cooled to −30°C and a solution of 8.4232 g (0.04 mol) of trimellitic acid 1,2-anhydride-chloride in 60 ml of 1,2-dichloroethane is added dropwise at this temperature. The reaction mixture is then kept at −20°C for 20 minutes, followed by 60 minutes at 5°–10°C, and finally a solution of 4.048 g (0.04 mol) of triethylamine in 50 ml of anhydrous DMA is added dropwise. After stirring the reaction mixture for a further hour, at 15°–20°C, the triethylamine hydrochloride is filtered off through a glass frit and carefully rinsed three times with DMA. A solution of 8.776 g (0.04 mol) of (γ-aminopropyl)-di-n-propoxy-methylsilane in 50 ml of DMA is introduced over the course of 10 minutes into the solution of the polyamide block with terminal anhydride groups (average molecular weight approx. 1,400) obtained above, at 15°–20°C. After stirring for two hours at room temperature (20°–25°C), a solution of a polyamide prepolymer with terminal methyl-di-n-propoxysilyl groups and an average molecular weight of approx. 1,850 is obtained; $\eta_{inh.}$ 0.11 dl/g (0.5% in DMA at 25°C). This solution is made up to a total of 440 g with anhydrous DMA. 22 g (0.001 mol) portions of the resulting diluted solution are mixed a. with 0.39 g (0.001 mol) of decamethyl-pentasiloxane-1,9-diol, (Example 6), b. with 0.58 g (0.0015 mol) of decamethyl-pentasiloxane-1,9-diol (Example 7), and c. with 0.78 g (0.002 mol) of decamethyl-pentasiloxane-1,9-diol (Example 8)

and the mixtures are then converted in the manner described in Example 1 to coatings or films of the corresponding crosslinked polyamide. Coating and films with good thermal and mechanical properties are obtained, which display an increasingly opaque appearance with increasing silicon content.

Silicon content for Example 6: 20.2% by weight
Silicon content for Example 7: 23.0% by weight
Silicon content for Example 8: 25.4% by weight.

EXAMPLES 9 – 11

Analogously to Example 3, 21.628 g (0.2 mol) of m-phenylenediamine, 32.528 g (0.16 mol) of isophthalic acid dichloride and 32.4 g (0.32 mol) of triethylamine are reacted first with 16.830 g (0.08 mol) of trimellitic acid 1,2-anhydridechloride to give a polyamide block possessing anhydride end groups and subsequently with 24.920 g (0.08 mol) of [γ-(4-aminophenoxy)-propyl]-di-n-propoxy-methylsilane to give a polyamide prepolymer with terminal methyl-di-n-propoxy-silyl groups; average molecular weight approx. 2,000. The resulting solution is made up to a total of 727 g with anhydrous DMA. 36.34 g (0.002 mol) portions of the resulting dilute solution are mixed a. with 0.544 g (0.0014 mol) of decamethyl-pentasiloxane-1,9-diol (Exaple 9), b. with 0.78 g (0.002 mol) of decamethyl-pentasiloxane-1,9-diol (Example 10), and c. with 1.17 g (0.003 mol) of decamethyl-pentasiloxane-1,9-diol (Example 11)

and the mixture are subsequently converted in the manner described in Example 1 to coatings or films of the corresponding crosslinked polyamide, which exhibit an increasingly opaque appearance with increasing silicon content.

Silicon content for Example 9: approx. 17.4% by weight
Silicon content for Example 10: approx. 20.5% by weight
Silicon content for Example 11: approx. 24.0% by weight.

EXAMPLES 12 – 14

If in Examples 9 – 11, paragraph 2, whilst otherwise following the same procedure, instead of using 0.544, 0.78 or 1.17 g of decamethyl-pentasiloxane-1,9-diol corresponding molar amounts of diphenylsilanediol are used, that is to say 0.0014 mol of diphenylsilanediol (Example 12)
0.002 mol of diphenylsilanediol (Example 13) or
0.003 mol of diphenylsilanediol (Example 14), clear coatings and films are obtained which exhibit excellent thermal and mechanical properties.

Silicon content for Example 12: approx. 7.6% by weight
Silicon content for Example 13: approx. 8.5% by weight
Silicon content for Example 14: approx. 9.6% by weight.

The diluted polymer solutions containing the diphenylsilanediol are also suitable for the manufacture of laminates from glass fibre fabric.

EXAMPLE 15

26.5 g (0.082 mol) of finely powdered 3,3',4,4'-benzophenonetetracarboxylic acid dianhydride are suspended in 50 ml of anhydrous DMA under a nitrogen atmosphere in a 350 ml sulphonation flask which is equipped with a stirrer, dropping funnel and internal thermometer. A solution of 8.15 g (0.041 mol) of 4,4'-diaminodiphenylmethane in 34 ml of anhydrous DMA is added dropwise to the resulting suspension over the course of 30 minutes whilst stirring at 10°–15°C, and the reaction mixture is then stirred for 2 hours at room temperature (20°–25°C). The resulting solution is cooled to 0°–5°C; thereafter, 25.6 g (0.082 mol) of [γ-(4-aminophenoxy)-propyl]-di-n-propoxy-methylsilane are added dropwise at this temperature over the course of 30 minutes. [$\eta_{inh.}$ of the prepolymer 0.083 dl/g (0.5% in DMA at 25°C].

After stirring for 30 minutes, a solution of 17.7 g (0.082 mol) of diphenylsilanediol in 28 ml of anhydrous DMA is added dropwise to the resulting reaction mixture at 10°–15°C. A 42% strength solution of a crosslinkable polyamide-acid is thus obtained.

Glass fibre fabric (for example E-glass with an aminosilane finish) is impregnated with this solution by drawing the fabric once through the polymer solution. The impregnated fabrics are dried for one hour at 50°C/200 mm Hg and for one hour at 50°/10$^{-1}$ mm Hg. Several of the prepregs thus obtained are stacked on top of one another and pressed in a platen press at 165°C to give laminates, the pressing being carried out for 5 minutes under contact pressure and for 7 hours under a pressure of 500 kp/cm$^2$. During the first hour, the pressure is released periodically to facilitate the removal of volatile products. Thereafter, the laminates are post-cured for 16 hours at 160°–200°C/20 mm Hg. After complete curing, the resin content of the laminates is 20% by weight (determined by ashing). Well-bonded, bubble-free laminates of good heat stability and excellent mechanical and electrical properties are obtained.

EXAMPLE 16

Following the procedure described in Example 15, 26.5 g (0.082 mol) of 3,3',4,4'-benzophenonetetracarboxylic acid di-anhydride in 84 ml of anhydrous DMA are reacted with 8.15 g (0.041 mol) of 4,4'-diaminodiphenylmethane. The resulting solution of the polyamide-acid block possessing anhydride end groups is then treated with 18.0 g (0.082 mol) of (γ-aminopropyl)-di-n-propoxy-methylsilane at 0°–5°C and the mixture is stirred for 30 minutes. A solution of 17.7 g (0.082 mol) of diphenylsilanediol in 25 ml of anhydrous DMA is added dropwise at 10°–15°C to the resulting 40% strength solution of the polyamide-acid prepolymer [viscosity of the solution 300 centipoise at 25°C; $\eta_{inh.}$ of the prepolymer 0.086 dl/g; 0.5% in DMA at 25°C], and the reaction mixture is stirred for 1 hour at constant temperature.

The resulting solution of the crosslinkable polyamide-acid is converted to laminates in the manner described in Example 15.

EXAMPLE 17

Analogously to the procedure described in Example 15, 43.5 g (0.135 mol) of 3,3',4,4'-benzophenonetetracarboxylic acid dianhydride in 160 ml of anhydrous DMA are reacted with 17.9 g (0.09 mol) of 4,4'-diaminodiphenylmethane and subsequently with 28.0 g (0.09 mol) of [γ-(4-aminophenoxy)-propyl]-di-n-propoxy-methylsilane. A solution of 20.5 g (0.09 mol) of diphenylsilanediol in 74 ml of anhydrous DMA is added dropwise to the resulting reaction solution at 10°–15°C and the mixture is stirred for one hour at constant temperature. A 33% strength solution of a crosslinkable polyamide-acid having a viscosity of 400 centipoise at room temperature is obtained.

Glass fibre fabric is impregnated with this solution in the manner described in Example 15, but is dried at 50 mm Hg for 16 hours at 50°C, then for 1 hour at 100°C and finally for 2 hours at 150°C. Several of the prepregs thus obtained are stacked on top of one another and pressed in a platen press at 230°C under a pressure of 500 kp/cm² to give laminates. Firmly bonded bubble-free laminates of good flexural strength are obtained.

EXAMPLE 18

Example 15, paragraph 1, is repeated, but using 12.89 g (0.04 mol) of 3,3′,4,4′-benzophenonetetracarboxylic acid dianhydride, 5.95 g (0.03 mol) of 4,4′-diaminodiphenylmethane, 70 ml of anhydrous DMA, 4.39 g (0.02 mol) of (γ-aminopropyl)-di-n-propoxy-methylsilane and 4.33 g (0.02 mol) of diphenylsilanediol. A 30% strength solution of a crosslinkable polyamide-acid is obtained, which is cast on aluminium sheets and spread to give a thin layer. The sheets had beforehand been mechanically roughened and degreased with acetone. The coated sheets are then dried in a drying cabinet under the following conditions: for 16 hours at 50°C/20 mm Hg and for half an hour at each of 70°C, 90°C, 100°C, 120°C and 140°C/20 mm Hg and thereafter for 2 hours at 150°C/20 mm Hg. Postcuring is then carried out for 2 hours at $10^{-2}$ mm Hg/230°C. Bubble-free, hard and flexible coatings are thus obtained, which exhibit good adhesion and good extensibility in the falling ball test up to 130 cm/kg; silicon content: 4.3% by weight.

Copper wires can be coated analogously by dipping these into the prepolymer solution and drying and curing as described. Wire lacquer insulations of good flexibility are obtained.

EXAMPLE 19

8.12 g (0.04 mol) of isophthalic acid dichloride are dissolved in 60 ml of anhydrous DMA at −15°C under nitrogen, in a 200 ml sulphonation flask equipped with a stirrer, dropping funnel and internal thermometer. A solution of 17.5 g (0.08 mol) of (γ-aminopropyl)-di-n-propoxy-methylsilane and 8.08 g (0.08 mol) of triethylamine in 40 ml of anhydrous DMA is added dropwise thereto at a temperature of −10°C to −15°C whilst stirring and the reaction mixture is then stirred for 20 minutes at 0°–5°C [$\eta_{inh.}$ of the prepolymer 0.04 dl/g; 0.5% in DMA at 25°C; $a = 0$].

A solution of 17.3 g (0.08 mol) of diphenylsilanediol in 20 ml of anhydrous DMA is then added dropwise at this temperature and the reaction mixture is stirred for 2 hours at room temperature. After filtering off the triethylamine hydrochloride, which has precipitated, on a glass frit, a 30% strength solution of a crosslinkable prepolymer is obtained.

Glass fibre fabric is impregnated by dipping in this solution. The impregnated fabric is then briefly dried in a vacuum drying cabinet at 50°C/300 mm Hg. This operation is repeated 7 more times in order to apply sufficient resin to the fabric. Thereafter, the fabric is dried for one hour at 50°C/300 mm Hg and for 1 hour at 50°C/$10^{-2}$ mm Hg. Several of the dried prepregs thus obtained are stacked on top of one another and pressed in a platen press at 165°C and a pressure of 400 kp/cm² for 7 hours and then post-cured for 16 hours at 200°C/$10^{-1}$ mm Hg. A laminate of good bond strength is obtained.

EXAMPLE 20

12.9 g (0.04 mol) of finely powdered 3,3′,4,4′-benzophenonetetracarboxylic acid dianhydride are suspended in 50 ml of anhydrous DMA under nitrogen in a 200 ml sulphonation flask equipped with a stirrer, dropping funnel and internal thermometer. The reaction mixture is cooled to 0-5°C and 17.5 g (0.08 mol) of (γ-aminopropyl)-di-n-propoxy-methylsilane are then added dropwise whilst stirring. After stirring the reaction mixture for one hour at 10°–15°C, 17.3 g (0.08 mol) of diphenylsilanediol, dissolved in 20 ml of anhydrous DMA, are added dropwise and the reaction mixture is stirred for a further hour at room temperature. A clear solution of a cross-linkable prepolymer is obtained, which is processed in the manner described in Example 19 ($a = 0$).

$\eta_{inh.}$ of the silicon-modified prepolymer: 0.044 dl/g (0.5% in DMA at 25°C).

EXAMPLE 21

4.06 g (0.02 mol) of isophthalic acid dichloride are dissolved in 25 ml of anhydrous DMA under nitrogen at −15°C. 1.08 g (0.01 mol) of pulverulent m-phenylenediamine are added in portions whilst stirring and the reaction mixture is stirred for 1 hour at 0°C. At this temperature, a solution of 2.02 g (0.02 mol) of triethylamine in 7 ml of anhydrous DMA is added dropwise and the mixture is stirred for a further hour. A solution of 4.4 g (0.02 mol) of (γ-aminopropyl)-di-n-propoxy-methylsilane and 2.02 g (0.02 mol) of triethylamine in 7 ml of anhydrous DMA is then added dropwise and the reaction mixture is stirred for 1 hour at 10°C. Finally, 4.33 g (0.02 mol) of diphenylsilanediol, dissolved in 10 ml of anhydrous DMA, are added dropwise at this temperature, and the reaction mixture is stirred for a further 2 hours at room temperature. The triethylamine hydrochloride which was precipitated is filtered off. The resulting solution of the crosslinkable polyamide prepolymer is completely evaporated to dryness in vacuo at 60°C. The resulting dry press powder is pressed to give sheets by the compression moulding process at 165°C under a pressure of 200 kp/cm². For post-curing, the sheets are heated for 16 hours at 200°C/$10^{-1}$ mm Hg. Transparent sheets having a silicon content of approx. 11% by weight are obtained.

EXAMPLE 22

A solution of 10.01 g (0.05 mol) of 4,4′-diaminodiphenyl-ether in 60 ml of anhydrous DMA is added dropwise over the course of 15 minutes to a solution of 11.99 g (0.055 mol) of pyromellitic acid dianhydride in 40 ml of anhydrous DMA at between 20° and 30°C under nitrogen in an apparatus of the type described in Example 15, and after completion of the addition the mixture is stirred for approximately 1 hour longer at room temperature. A solution of 2.19 g (0.01 mol) of (γ-aminopropyl)-di-n-propoxy-methylsilane in 10 ml of DMA is then added dropwise at room temperature and the reaction mixture is stirred for a further hour. [$\eta_{inh.}$ of the prepolymer 0.38 dl/g; 0.5% in DMA at 25°C; average value of $a = 10$].

Thereafter a solution of 1.95 g (0.005 mol) of HO-Si(CH₃)₂-[O-Si(CH₃)₂]₄—OH in 20 ml of DMA is added to the resulting 25% strength solution of the polyamide-acid prepolymer having two silicon-functional end groups, at room temperature and whilst stirring.

Films are cast from the above prepolymer solution both on glass plates and on aluminium sheets. After stripping off the solvent, these films are converted into crosslinked siloxane-modified polyimide films by heating for two hours to 220°C and subsequently heating for one hour to 250°C; the films contain approx. 3.1% by weight of Si in the form of polysiloxane radicals in a non-extractable form. The films remain very elastic even at low temperatures and exhibit very good corona resistance.

EXAMPLE 23

If in Example 22, whilst otherwise employing the same procedure, double the amount (3.9 g; 0.01 mol) of decamethylpentasiloxane-1,9-diol is used, films with similar properties and a silicon content of 5.8% by weight are obtained.

EXAMPLE 24

Example 22 is repeated, but using 11.45 g (0.052 mol) of pyromellitic acid dianhydride, the same amount of 4,4'-diaminodiphenyl-ether, 1.45 g (0.005 mol) of (γ-aminopropyl)-di-n-propoxy-methylsilane and 1.8 g (0.005 mol) of diphenylsilanediol, dissolved in 10 ml of DMA, instead of decamethylpentasiloxanediol (average value of $a = 25$; $\eta_{inh.}$ of the silicon-modified prepolymer = 0.6 dl/g; 0.5% in DMA at 25°C).

Thereafter crosslinked siloxane-modified polyimide films are produced from the resulting prepolymer solution in the manner described in Example 22. These films exhibit a silicon content of 1.9% by weight and are distinguished by good elasticity even at low temperatures and by very good corona resistance.

EXAMPLE 25

12.63 g (0.06 mol) of trimellitic acid 1,2-anhydride-chloride are dissolved in 50 ml of anhydrous DMA at −15°C under nitrogen in an apparatus of the type described in Example 15. A solution of 26.32 g (0.12 mol) of (γ-aminopropyl)-di-n-propoxy-methysilane and 6.07 g (0.06 mol) of triethylamine in 37 ml of anhydrous DMA is added dropwise to this solution, whilst stirring, in such a way that the reaction temperature does not exceed −15°C. After completion of the addition, the reaction mixture is stirred for 30 minutes at 0°–5°C and at this temperature a solution of 25.96 g (0.012 mol) of diphenylsilanediol in 10 ml of anhydrous DMA is added dropwise. The reaction mixture is then stirred for 2 hours at 20°–25°C and the triethylamine hydrochloride which has precipitated is filtered off.

Glass fibre fabric is impregnated with the resulting prepolymer solution and briefly dried in a vacuum drying cabinet at 50°C/300 mm Hg. This operation is repeated 6 times in order to apply sufficient resin to the fabric. The fabric is then dried for one hour at 50°C/100 mm Hg and for 1 hour at 50°C/10$^{-2}$ mm Hg. Several of the dried prepregs thus obtained are stacked on top of one another and pressed in a platen press at temperatures between 130°C and 150°C and give well-bonded laminates.

EXAMPLE 26

5.28 g (0.0275 mol) of trimellitic acid anhydride and 10.91 g (0.055 mol) of 4,4'-diaminodiphenylmethane in 70 ml of N-methylpyrrolidone are heated for 4 hours to 185°C under nitrogen, whilst stirring. After cooling, the resulting solution is added dropwise to 17.73 g (0.055 mol) of 3,3',4,4'-benzophenonetetracarboxylic acid dianhydride in 50 ml of N-methylpyrrolidone at 0°C under nitrogen, whilst stirring. The reaction mixture is then stirred for 1 hour at room temperature and cooled to 0°–5°C, and a solution of 12.07 g (0.055 mol) of (γ-aminopropyl)-di-n-propoxy-methylsilane in 10 ml of N-methylpyrrolidone is added dropwise. The reaction mixture is then stirred for 30 minutes and a solution of 11.90 g (0.055 mol) of diphenylsilanediol in 20 ml of anhydrous DMA is added dropwise. After further stirring for 30 minutes at 20°–25°C, a solution of a prepolymer is obtained, which is converted to laminates in the manner described in Example 25, at 165°C.

EXAMPLE 27

8.06 g (0.025 mol) of 3,3',4,4'-benzophenonetetracarboxylic acid dianhydride and 5.26 g (0.025 mol) of trimellitic acid 1,2-anhydride-chloride are initially introduced into 45 ml of anhydrous DMA at −15°C under nitrogen in an apparatus of the type described in Example 15. A solution of 4.96 g (0.025 mol) of 4,4'-diaminodiphenylmethane and 2.53 g (0.025 mol) of triethylamine in 15 ml of anhydrous DMA is added dropwise thereto, whilst stirring, in such a way that the reaction temperature does not exceed −15°C. After completion of the addition and after stirring the reaction mixture for 2 hours at this temperature, a solution of 10.76 g (0.05 mol) of (γ-aminopropyl)-di-n-propoxy-methylsilane in 12 ml of anhydrous DMA is added dropwise. The reaction mixture is stirred for approx. 30 minutes at 0°–5°C and at this temperature a solution of 10.80 g (0.05 mol) of diphenylsilanediol in 20 ml of anhydrous DMA is then added dropwise. After stirring for a further 30 minutes at 20°–25°C and filtering off the triethylamine hydrochloride, a polyamide-amide-acid prepolymer solution is obtained, which is used as follows for the manufacture of laminates:

Glass fibre fabric (for example E-glass with an aminosilane finish) is dipped into the prepolymer solution obtained and the impregnated fabric is briefly dried in a vacuum drying cabinet at 50°C/100 mm Hg. This operation is repeated 5 times. The fabric is then dried for one hour at 50°C/20 mm Hg and for 1 hour at 50°C/10$^{-2}$ mm Hg. Several of the dried prepregs thus obtained are stacked on top of one another and pressed in a platen press at 165°C and a pressure of 250 kp/cm² for 1 hour and 350 kp/cm² for 6 hours. After post-curing at 225°C/10$^{-2}$ mm Hg for 16 hours, laminates of good bond strength are obtained.

EXAMPLE 28

Analogously to Example 27, 9.159 g (0.435 mol) of trimellitic acid 1,2-anhydride-chloride, 9.48 g (0.0435 mol) of pyromellitic acid dianydride, 8.71 g (0.0435 mol) of 4,4'-diaminodiphenyl-ether and 4.40 g (0.0435 mol) of triethylamine in 130 ml of anhydrous DMA are reacted with 19.26 g (0.087 mol) of (γ-aminopropyl)-triethoxysilane and subsequently with 18.80 g (0.087 mol) of diphenylsilanediol dissolved in 25 ml of anhydrous DMA. A solution of a polyamide-amide-acid prepolymer is obtained, which is converted in the manner described in Example 27 to give laminates of good bond strength.

EXAMPLE 29

5.26 g (0.025 mol) of trimellitic acid 1,2-anhydride-chloride are dissolved in 35 ml of anhydrous DMA at −15°C to −20°C under nitrogen in an apparatus of the type described in Example 15. A solution of 2.48 g (0.0125 mol) of 4,4'-diaminodiphenylmethane and 2.53 g (0.025 mol) of triethylamine in 15 ml of anhydrous DMA is added dropwise to the solution obtained, with cooling and constant stirring, in such a way that the temperature in the reaction vessel does not exceed −15°C. After completion of the addition, the mixture is stirred for a further 15 minutes at the same temperature and a solution of 5.38 g (0.025 mol) of (γ-aminopropyl)-di-n-propoxy-methylsilane in 6 ml of anhydrous DMA is then added dropwise. The reaction mixture is stirred for approx. 30 minutes at 0°–5°C, after which a solution of 5.40 g (0.025 mol) of diphenylsilanediol in 20 ml of DMA is added dropwise. Finally, the reaction mixture is stirred for a further 30 minutes at 20°–25°C and the triethylamine hydrochloride which has precipitated is filtered off.

Laminates are manufactured with the resulting prepolymer solution, as described in Example 27, the prepregs being pressed as follows: for 5 minutes at 150°C and under contact pressure, then for 30 minutes at 125 kp/cm$^2$, and 30 minutes at 250 kp/cm$^2$ and finally for 6 hours at 375 kp/cm$^2$. After post-curing at 225°C/10$^{-2}$ for 16 hours, laminates of good flexural strength are obtained.

EXAMPLE 30

2.316 g (0.011 mol) of trimellitic acid 1,2-anhydride-chloride, 3.544 g (0.011 mol) of 3,3', ,4,4'-benzophenonetetracarboxylic acid dianhydride, 3.965 g (0.020 mol) of 4,4'-diaminodiphenylmethane, 2.226 g (0.022 mol) of triethylamine and 0.877 g (0.004 mol) of (γ-aminopropyl)-di-n-propoxy-methylsilane are reacted in 102 ml of anhydrous DMA analogously to the procedure described in Example 29, paragraph 1. After stirring the reaction mixture for half an hour at 0°–5°C, a solution of 1.555 g (0.004 mol) of 1,1,3,3,5,5,7,7,9,9-decamethylpentasiloxane-1,9-diol in 5 ml of anhydrous DMA is added and the reaction mixture is stirred for a further 2 hours at 20°–25°C. After filtering off the triethylamine hydrochloride which has precipitated, the resulting prepolymer solution is cast on aluminium sheets. The coated sheets are heated as follows: for 3 hours at 70°C/30 mm Hg, for 3 hours at 110°C/30 mm Hg, for 3 hours at 150°C/30 mm Hg and for 4 hours at 250° C/10$^{-1}$ mm Hg.

After dissolving off the aluminium sheets with dilute hydrochloric acid, films having a silicon content of 6.23% by weight are obtained. Coatings on aluminium foils can be produced analogously.

EXAMPLE 31

Analogously to the procedure described in Example 29, paragraph 1, 6.74 g (0.032 mol) of trimellitic acid 1,2-anhydride-chloride, 5.95 g (0.030 mol) of 4,4'-diaminodiphenylmethane, 3.24 g (0.032 mol) of triethylamine and 0.88 g (0.004 mol) of (γ-aminopropyl)-di-n-propoxy-methylsilane are reacted in 141 ml of anhydrous DMA. Thereafter, a solution of 0.865 g (0.004 mol) of diphenylsilanediol in 10 ml of anhydrous DMA is added to the reaction mixture. After filtering off the triethylamine hydrochloride, the resulting prepolymer solution is converted into clear, tough films as described in Example 30; silicon content of the films: 1.82% by weight.

EXAMPLE 32

A. Preparation of a polyamide block with amino end groups 2.812 g (0.026 mol) of m-phenylenediamine are dissolved in 50 ml of anhydrous DMA under nitrogen in a 500 ml sulphonation flask equipped with a stirrer, internal thermometer, dropping funnel and a nitrogen inlet tube. 4.872 g (0.024 mol) of isophthalic acid dichloride in solid form are added in portions to the resulting solution, whilst cooling to −15°C to −5°C, and the reaction mixture is kept for one hour at −5°C and then for 3 hours at 20°–25°C. A solution of 4.84 g (0.048 mol) of triethylamine in 30 ml of anhydrous DMA is then added dropwise at 5°–10°C to neutralise the hydrogen chloride produced. After stirring for one hour at room temperature, the triethylamine hydrochloride which has precipitated is filtered off under nitrogen and the reaction product is washed carefully three times with a little anhydrous DMA.

B. Preparation of a polyamide-acid block with anhydride end groups.

9.02 g (0.028 mol) of 3,3',4,4'-benzophenonetetracarboxylic acid dianhydride are suspended in 65 ml of anhydrous DMA under nitrogen in an apparatus of the type described above. A solution of 4.806 g (0.024 mol) of 4,4'-diaminodiphenyl-ether in 50 ml of anhydrous DMA is then added dropwise at 5°–20°C. The reaction mixture is then stirred for 1 hour at 20°–25°C.

C. Preparation of a polyamide-polyamide-acid prepolymer

The solution obtained according to A) is added dropwise to the solution obtained according to B) under nitrogen at 5°–10°C. Thereafter, the reaction mixture is stirred for 1 hour at 20°–25°C and is then cooled to 0°–5°C, and a solution of 0.878 g (0.004 mol) of (γ-aminopropyl)-di-n-propoxy-methylsilane is added dropwise. The resulting reaction solution is stirred for approx. 30 minutes at 0°–5°C. A solution of 0.865 g (0.004 mol) of diphenylsilanediol in 10 ml of anhydrous DMA is then added dropwise and the mixture is stirred for a further hour at 20°–25°C.

The resulting solution of a polyamide-polyamide-acid block copolymer is converted into films as described in Example 30; silicon content: approx. 1% by weight.

EXAMPLE 33

4.34 g (0.0218 mol) of 4,4'-diaminodiphehylmethane and 1.66 g (0.0164 mol) of triethylamine are dissolved in 50 ml of anhydrous DMA under nitrogen in an apparatus of the type described in Example 15, and the solution is cooled to −15°C. 3.46 g (0.0164 mol) of trimellitic acid 1,2-anhydride-chloride in powder form are added in portions to this solution in such a way that the reaction temperature does not exceed −15°C. The reaction mixture is then stirred for 1 hour at −15°C and for a further hour at 20°–25°C. The resulting solution is added dropwise to a solution of 2.2 g (0.0068 mol) of 3,3',4,4'-benzophenonetetracarboxylic acid dianhydride in 40 ml of anhydrous DMA at 0°C, whilst stirring. The reaction solution is stirred for a further hour at 20°–25°C and then cooled to 0°–5°C, and a solution of 0.6 g (0.0027 mol) of (γ-aminopropyl)-di-n-propoxy-methylsilane in 10 ml of DMA is added. The reaction solution is then stirred for approx. 30 minutes at 5°–10°C and a solution of 0.59 g (0.0027 mol) of diphenylsilanediol in 10 ml of DMA is then added. After further stirring for one hour at 20°–25°C and filtering off the triethylamine hydrochloride which has precipitated, the resulting solution of a prepolymer with a block-like arrangement of the polyamide-amide-acid units is cast on aluminium sheets and spread to form a thin layer. The sheets had beforehand been mechanically roughened and cleaned with acetone. The coated sheets are dried in a driving cabinet under the following conditions: for 16 hours at 50°C/20 mm Hg, then for 30 minutes at each of 70°C, 90°C, 100°C, 120°C and 140°C/20 mm Hg and finally for 2 hours at 150°C/20 mm Hg.

After post-curing for 2 hours at 230°C/$10^{-2}$ mm Hg, bubble-free coatings of good adhesion are obtained; silicon content: 1.56% by weight.

EXAMPLE 34

A. Preparation of a polyamide block with amino end groups

Analogously to the procedure described in Example 32 under A), 14.059 g (0.130mol) of m-phenylenediamine, 24.364 g (0.12 mol) of isophthalic acid dichloride and 24.288 g (0.24 mol) of triethylamine are reacted in 178 ml of anhydrous DMA to give a polyamide block with amino end groups.

B. Preparation of the prepolymer

The solution obtained according to A) is added dropwise to a solution of 4.834 g (0.015 mol) of 3,3′,4,4′-benzophenonetetracarboxylic acid dianhydride in 163 ml of anhydrous DMA at 0°C under nitrogen, whilst stirring. Thereafter, the resulting reaction solution is stirred for 1 hour at 20°–25°C and then cooled to 0°–5°C, and a solution of 2.194 g (0.01 mol) of (γ-aminopropyl)-di-n-propoxy-methylsilane in 10 ml of anhydrous DMA is added. After stirring for a further 30 minutes at 0°–5°C, a solution of 2.163 g (0.01 mol) of diphenylsilanediol in 10 ml of DMA is added. The reaction solution is stirred for a further hour at 20°–25°C.

Flexible coatings are produced with the resulting prepolymer solution in accordance with the process described in Example 33; silicon content: 1.5% by weight. Flexible films can also be manufactured analogously.

EXAMPLE 35

A. Preparation of a polyamide block with amino end groups

Analogously to the procedure described in Example 32 under A), 14.059 g (0.13 mol) of m-phenylenediamine, 24.364 g (0.12 mol) of isophthalic acid dichloride and 24.288 g (0.24 mol) of triethylamine are reacted in 176 ml of anhydrous DMA to give a polyamide block with amino end groups.

B. Preparation of the prepolymer

To the solution obtained according to A) are added, whilst stirring and under nitrogen, at −15°C, first 0.404 g (0.004 mol) of triethylamine in 5 ml of DMA and then, in portions, a mixture of 1.289 g (0.004 mol) of pulverulent 3,3′,4,4′-benzophenonetetracarboxylic acid dianhydride and 0.842 g (0.004 mol) of pulverulent trimellitic acid 1,2-anhydride-chloride. In the course thereof, the reaction temperature should not exceed −15°C. After completion of the addition, the reaction mixture is stirred first for 1 hour at −15°C and then for a further hour at 0°C and thereafter a solution of 1.878 g (0.004 mol) of trimellitic acid 1,2-anhydride 4′-[γ-(di-n-propoxy-methylsilyl)-propyl]-anilide in 39 ml of anhydrous DMA is added dropwise. The reaction mixture is then stirred for 30 minutes at 0°–5°C, a solution of 0.865 g (0.004 mol) of diphenylsilanediol in 10 ml of anhydrous DMA is added and the mixture is again stirred for 2 hours at 20°–25°C. A solution of a polyamide-polyamide-acid prepolymer with a statistical distribution of the amide-acid units is obtained.

This solution is converted to coatings in the manner described in Example 33; silicon content: 0.66% by weight.

What we claim is:

1. Crosslinked polyamides, polyimides or polyamide-imides containing siloxane groups and having a silicon content of 0.2 to 38.0% by weight, which are obtainable by heating a silicon-modified polyamide, polyamide-acid or polyamide-amide-acid monomer or prepolymer having an inherent viscosity of 0.04 to 4.0, of the formula I

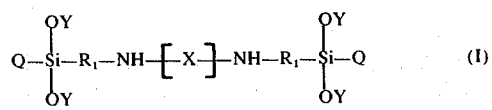

wherein X represents a structural element of the formula II

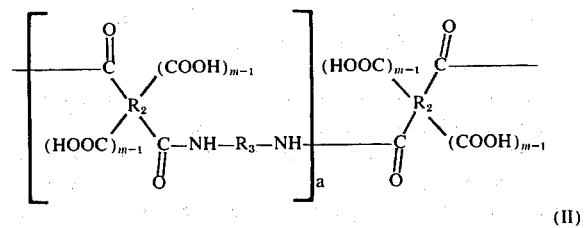

a denotes a number from 0 to 100, and the individual m, $R_1$, $R_2$, $R_3$, Q and Y independently of one another denote the following: m denotes the number 1 or 2, $R_1$ denotes a radical $+CH_2+_{\overline{x}}$,

or

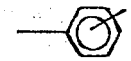

with x denoting a number from 1 to 4, $R_2$ denotes a carbocyclic-aromatic or heterocyclic radical, wherein the cabonamide and carboxyl groups are bonded to different ring carbon atoms and the carboxyl groups are each in the ortho-position to a carbonamide group, $R_3$ denotes an aliphatic radical with at least 2 carbon atoms, or a cycloaliphatic, araliphatic, carbocyclic-aromatic or heterocyclic radical, Q denotes methyl, phenyl or a —OY radical, with Y having the meaning indicated below, and Y denotes an alkyl radical with 1 to 6 carbon atoms or a phenyl radical, or corresponding cyclised derivatives, in the presence of a compound or a mixture of compounds of the formula VI

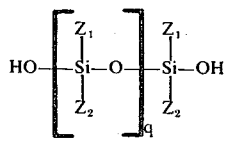

wherein $Z_1$ and $Z_2$ independently of one another denote methyl or phenyl and q denotes a number from 0 to 1,000, to temperatures between 50° and 350°C.

2. Crosslinked polyamides, polyimides or polyamide-imides containing siloxane groups, according to claim 1, which are obtainable by heating to temperatures between 15° and 225°C.

3. Crosslinked polyamides, polyimides or polyamide-imides containing siloxane groups, according to claim 1, which are obtainable by using a compound of the formula VI, wherein $Z_1$ and $Z_2$ each denote methyl and q denotes a number from 1 to 200.

4. Crosslinked polyamides, polyimides or polyamide-imides containing siloxane groups, according to claim 1, which are obtainable by using diphenylsilanediol as the compound of the formula VI.

5. Crosslinked polyamides, polyimides or polyamide-imies containing siloxane groups, according to claim 1, which are obtainable by using a silicon-modified monomer or prepolymer of the formula I, wherein the individual $R_2$ independently of one another represent an unsubstituted monocyclic, fused polycyclic or non-fused bicyclic aromatic radical, the aromatic nuclei, in the latter case, being bonded to one another via the bridge member —O— or —CO—, the individual $R_3$ independently of one another represent a monocyclic or non-fused bicyclic aromatic radical which is optionally substituted by halogen atoms or alkyl or alkoxy groups with 1–4 carbon atoms each, an unsubstituted monocyclic araliphatic radical or an unsubstituted aliphatic radical with 2–10 carbon atoms, and what has been stated in claim 1 applies to a, m, $R_1$, Q and Y, or corresponding cyclised derivatives.

6. Crosslinked polyamides, polyimides or polyamide-imides containing siloxane groups, according to claim 1, which are obtainable by using a silicon-modified monomer or prepolymer of the formula I, wherein $R_2$ represents the 1,4- or 1,3-phenylene radical, a benzene ring or the benzophenone ring system and $R_3$ represents the 1,4- or 1,3-phenylene radical, the 4,4'-diphenyl-ether radical or 4,4'-diphenylylmethane radical, but of $R_2$ and $R_3$ only one denotes a 1,4-phenylene radical, and what has been stated in claim 1 applies to a, m, $R_1$, Q and Y, or corresponding cyclised derivaties.

7. Crosslinked polyamides, polyimides or polyamide-imides containing siloxane groups, according to claim 1, which are obtainable by using silicon-modified prepolymers of the formula I, wherein, if a ≥ 1, the individual $R_2$ and $R_3$ have the same meaning, m is the same for each radical $R_2$, and what has been stated in claim 1 applies to $R_1$, Q and Y, or the corresponding cyclised derivatives.

8. Crosslinked polyamide-imides contaning siloxane groups, according to claim 1, which are obtainable by using silicon-modified prepolymers of the formula I, wherein X represents a structural element of the formula IIb

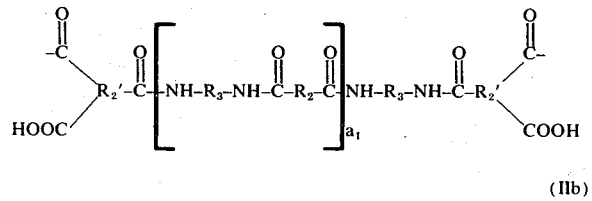

in which $a_1$ denotes a number from 1 to 99 and the two $R_2'$ each represent a benzene ring, with the carbonamide and carboxyl groups being bonded to different ring carbon atoms and the carboxyl groups each being in the ortho-position to the —CO—NH—$R_1$— grouping, and the individual $R_1$, $R_2$, $R_3$, Q and Y are identical, or corresponding derivatives with cyclised terminal carboxylic acid groups.

9. Crosslinked polyamide-imides containing siloxane groups, according to claim 1, which are obtainable by using silicon-modified prepolymers of the formula I, wherein X represents a structural element of the formula IIc

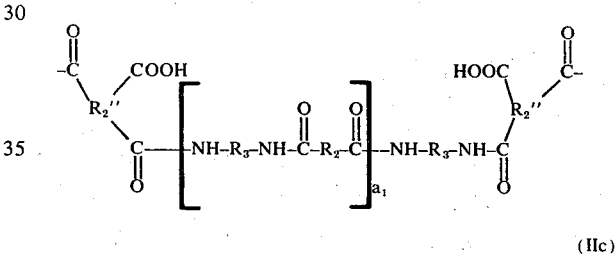

in which $a_1$ denotes a number from 1 to 99 and the two $R_2''$ each denote a benzene ring, with the carbonamide groups and carboxyl groups being bonded to different ring carbon atoms and the carboxyl groups being each in the ortho-position to the —CO—NH—$R_3$— grouping, and the individual $R_1$, $R_2$, $R_3$, Q and Y are identical, or corresponding derivatives with cyclised terminal carboxylic acid groups.

10. Crosslinked polyamide-imides containing siloxane groups, according to claim 8, which are obtainable by using silicon-modified prepolymers of the formula I, wherein $R_1$ in each case denotes a $-(CH_2)_3-$,

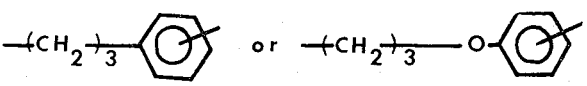

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group and what has been stated under claim 8 applies to $a_1$ and $R_2'$, or corresponding derivatives with cyclised terminal carboxylic acid groups.

11. Crosslinked polyamides containing siloxane groups, according to claim 1, which are obtainable by using a silicon-modified monomer or prepolymer of the formula I, wherein $m$ in each case denotes the number 1, $R_1$ in each case represents a $+CH_2+_3$

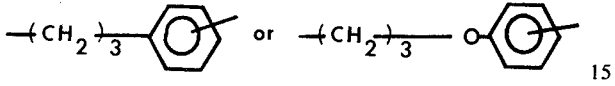

radical, the individual $R_2$ and $R_3$ are identical and one of $R_2$ and $R_3$ represents the 1,4-phenylene radical and the other the 1,3-phenylene radical or $R_2$ and $R_3$ each represent the 1,3-phenylene radical, Q represents the methyl group and Y represents a propyl group or Q represents the ethoxy group and Y represents the ethyl group and what has been stated in claim 1 applies to $a$.

12. Crosslinked polyimides containing siloxane groups, according to claim 1, which are obtainable by using a silicon-modified monomer or prepolymer of the formula I, wherein $m$ in each case denotes the number 2, $R_1$ in each case represents a $+CH_2+_3$,

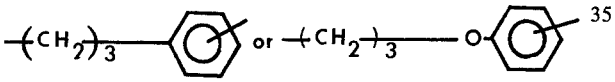

radical, $R_2$ in each case denotes a benzene ring or the benzophenone ring system, $R_3$ in each case denotes the 4,4'-diphenylyl-ether or the 4,4'-diphenylylmethane radical, Q denotes the methyl group and Y denotes a propyl group or Q denotes the ethoxy group and Y denotes the ethyl group and what has been stated in claim 1 applies to $a$, or corresponding cyclised derivatives.

13. Crosslinked polyamide-imides containing siloxane groups, according to claim 1, which are obtainable by using a silicon-modified monomer or prepolymer of the formula I, wherein X represents a structural element of the formula IId

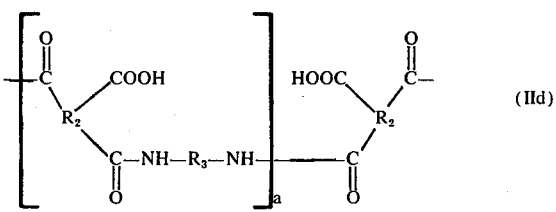

in which $R_1$ in each case represents a $+CH_2+_3$,

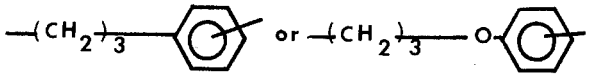

radical, $R_2$ in each case denotes a benzene ring and $R_3$ in each case denotes the 4,4'-diphenylyl-ether or the 4,4'-diphenylylmethane radical, Q denotes the methyl group and Y denotes a propyl group or Q denotes the ethoxy group and Y denotes the ethyl group, and what has been stated in claim 1 applies to a, or corresponding cyclised derivatives.

14. Crosslinked polyamide-imides containing siloxane groups, according to claim 9, which are obtainable by using silicon-modified prepolymers of the formula I, wherein $R_1$ in each case represents a $+CH_2+_3$, radical, the individual $R_2$ and $R_3$ are respectively identical and one of $R_2$ and $R_3$ denotes the 1,4-phenylene radical and the other the 1,3-phenylene radical, or $R_2$ and $R_3$ each denote the 1,3-phenylene radical, Q denotes the methyl group and Y denotes a propyl group or Q denotes the ethoxy group and Y denotes the ethyl group and what has been stated in claim 9 applies to $a_1$ and $R_2''$, corresponding derivatives with cyclised terminal carboxylic acid groups.

* * * * *